US011647354B2

(12) United States Patent
Redmann

(10) Patent No.: US 11,647,354 B2
(45) Date of Patent: *May 9, 2023

(54) METHOD AND APPARATUS FOR PROVIDING AUDIO CONTENT IN IMMERSIVE REALITY

(71) Applicant: InterDigital Madison Patent Holdings, SAS, Paris (FR)

(72) Inventor: William G. Redmann, Glendale, CA (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/720,167

(22) Filed: Apr. 13, 2022

(65) Prior Publication Data

US 2022/0248162 A1     Aug. 4, 2022

Related U.S. Application Data

(63) Continuation of application No. 16/755,496, filed as application No. PCT/IB2018/001299 on Oct. 12, 2018, now Pat. No. 11,323,838.

(60) Provisional application No. 62/571,512, filed on Oct. 12, 2017.

(51) Int. Cl.
*H04S 7/00* (2006.01)
*G06F 3/16* (2006.01)

(52) U.S. Cl.
CPC .............. *H04S 7/304* (2013.01); *G06F 3/167* (2013.01)

(58) Field of Classification Search
CPC .................................. H04S 7/304; G06F 3/167
See application file for complete search history.

(56) References Cited

U.S. PATENT DOCUMENTS

| 7,669,219 B2 | 2/2010 | Scott, III |
| 2011/0058662 A1 | 3/2011 | Yoakum |
| 2015/0382127 A1 | 12/2015 | Sun |
| 2017/0045941 A1 | 2/2017 | Tokubo |
| 2017/0235360 A1 | 8/2017 | George-Svahn |

FOREIGN PATENT DOCUMENTS

WO    2014130221 A1    8/2014

OTHER PUBLICATIONS

International Search Report and Written Opinion of the International Searching Authority for PCT/IB2018/001299 dated Feb. 27, 2019 (12 pages).
International Preliminary Report on Patentability for PCT/IB2018/001299 dated Apr. 14, 2020 (7 pages).

*Primary Examiner* — David L Ton
(74) *Attorney, Agent, or Firm* — Smadar Gefen

(57) ABSTRACT

Methods and apparatuses of providing and receiving audio content are described. The method of providing audio content includes receiving a first audio content from a first user, processing the first audio content based on a first viewing direction for the first user facing at least one section of an audiovisual content and on a second viewing direction for a second user facing at least one section of the audiovisual content, and providing the processed first audio content. The audiovisual content may be an immersive reality content. A computer-readable storage medium, computer program and a non-transitory article of manufacture are described.

20 Claims, 8 Drawing Sheets

METHOD AND APPARATUS FOR PROVIDING AUDIO CONTENT IN IMMERSIVE REALITY

CROSS-REFERENCE TO RELATED APPLICATIONS

The present application is a continuation application of U.S. patent application Ser. No. 16/755,496, entitled "METHOD AND APPARATUS FOR PROVIDING AUDIO CONTENT IN IMMERSIVE REALITY," filed Apr. 10, 2020, which is hereby incorporated herein by reference in its entirety, and which claims benefit under 35 U.S.C. § 371 of International Application No. PCT/IB2018/001299, entitled "METHOD AND APPARATUS FOR PROVIDING AUDIO CONTENT IN IMMERSIVE REALITY," filed on Oct. 12, 2018, which claims benefit under 35 U.S.C. § 119(e) from U.S. Provisional Patent Application Ser. No. 62/571,512, filed Oct. 12, 2017, entitled "Method and Apparatus for Providing Audio Content in Immersive Reality,"

TECHNICAL FIELD

At least one embodiment of the present disclosure relates to immersive reality, in particular, to providing and/or receiving audio content among users sharing an immersive reality experience.

BACKGROUND

Any background information described herein is intended to introduce the reader to various aspects of art, which may be related to the present embodiments that are described below. This discussion is believed to be helpful in providing the reader with background information to facilitate a better understanding of the various aspects of the present disclosure. Accordingly, it should be understood that these statements are to be read in this light.

Immersive technology refers to technology that blurs the line between the physical world or reality and digital or simulated world or reality, thereby creating a sense of immersion, and includes virtual reality, augmented reality, augmented virtuality, and variants like mixed reality and merged reality. Virtual Reality (VR) has been defined as a realistic and immersive simulation of a three-dimensional environment, created using interactive software and hardware, and experienced or controlled by movement of the body or, simply put, an immersive, interactive experience generated by a computer. A person using VR equipment is typically able to "look around" the artificial world, move about in it and interact with features or items that are depicted on a screen or in goggles. Virtual realities artificially create sensory experiences, which may include sight, touch, hearing, and, less commonly, smell. Augmented Reality (AR) (and variants like mixed reality and merged reality) is a live direct or indirect view of a physical, real-world environment whose elements are augmented (or supplemented) by computer-generated sensory input such as sound, video, graphics or GPS data. It is related to a more general concept called mediated reality in which a view of reality is modified (possibly even diminished rather than augmented) by a computer. As a result, the technology functions by enhancing one's current perception of reality. By contrast, virtual reality replaces the real world with a simulated one. In the following, we will jointly refer to these various technologies as Immersive Reality (IR). Immersive realities may be displayed either on a computer monitor, a projector screen, or with a immersive reality headset or viewer (also called head-mounted display or HMD). HMDs typically take the form of head-mounted goggles or glasses with a screen in front of the eyes. Some simulations may include additional sensory information and provide sounds through speakers or headphones. Additionally, gloves or hand wearable devices fitted with sensors may be utilized.

Recently there has been a growth of available large field-of-view IR content (up to 360°), also called immersive or panoramic. Such content is potentially not fully visible by a user watching the content on immersive display devices such as mounted displays, smart glasses, PC screens, tablets, smartphones and the like. That means that at a given moment, a user may only be viewing a part of the content. However, a user may typically navigate within the content by various means such as head movement, mouse movement, touch screen, voice and the like.

Immersive reality systems are often seen as providing solo experiences. An individual user operates alone in the experience, without interaction with other participating users. In cases where multiple users might share an IR experience simultaneously, each occupies a unique position within the IR. That position is the basis for establishing an individual user's viewpoint, from which that user's view, the image of the IR shown to the user, is rendered. This is similar to many multi-user computer-rendered simulations (e.g., video games) where the view rendered for each user appears to be from a high vantage; or as in massively multi-player online games (MMOGs) where the view of each user is rendered from the point of view of their character, at roughly human scale.

However, some kinds of immersive reality content may not be suited to having multiple users, each with a discrete viewpoint. One example of this is a three degree-of-freedom (3 DoF) VR. One variety of 3 DoF VR is commonly called "360° video" or a "360° image". Typically, 3 DoF VR is derived from a cluster of outwardly facing cameras, where the images (or video) from the cameras in the cluster are warped and stitched to form a single, composite image (or composite video) that represents the view in all directions surrounding a viewpoint (or center point), which is the location of the camera cluster. In the case of 360° video, that viewpoint may be moving, e.g., aboard a roller coaster train, in which case the resulting 360° video captures the vantage of a roller coaster rider. The resulting composite image or video may be warped and cropped to give the view in one direction from that vantage, but as the user turns to face a different direction, the warp and crop is updated so that the view from that new direction is presented. When viewed by a user using a VR viewer or HMD, e.g., the Vive by HTC Corporation of Taiwan or Cardboard by Google, Inc. with an appropriately configured smartphone, then the view is updated to a new direction merely by the user turning their head to face a new direction. Alternatively, such 360° media may be viewed on a smartphone or computer workstation where changes in facing are achieved by moving a mouse or dragging on a touchscreen or other user interface, such that the display is updated with a view from the viewpoint in the new direction of facing.

In some cases, where the number and coverage of the cameras is sufficient, such 360° immersive media may be stereoscopic (i.e., 3D). When viewed using a stereoscopic viewer, two views are generated, both based on the same facing, but one apropos to the user's left eye, and one for the user's right eye, resulting in a 3D view from the vantage in the direction of the facing. Many examples of 360° video appear on the Virtual Reality channel provided by the YouTube web site by Google, Inc. of Mountain View, Calif.

The 3 DoF VR is not limited to 360° images or video captured by cameras. Such content may be animated or computer generated. Such immersive media may be interactive. For example, facing a particular direction in the VR, perhaps at a particular time, may change the performance, as in a scene, animated or not, that might remain fairly static until the user faces a direction in the VR offering a view of a path, at which point the viewpoint might advance along that path, perhaps until some kind of decision is needed or until some next particular facing at a choice of paths, or other interaction, is required.

SUMMARY

According to an aspect of the present disclosure, a method is provided including receiving a first audio content from a first user, processing the first audio content based on a first viewing direction for the first user facing at least one first section of an audiovisual content and on a second viewing direction for a second user facing at least one second section of the audiovisual content and providing the processed first audio content.

According to an aspect of the present disclosure, an apparatus is provided including a processor and at least one memory coupled to the processor, the processor being configured to receive a first audio content from a first user, process the first audio content based on a first viewing direction for the first user facing at least one first section of an audiovisual content and on a second viewing direction for a second user facing at least one second section of the audiovisual content and provide the processed first audio content.

According to an aspect of the present disclosure, a method is provided including receiving a processed first audio content from a first user based on a first viewing direction for the first user facing at least one first section of an audiovisual content and on a second viewing direction for a second user facing at least one second section of the audiovisual content and outputting the processed first audio content for audio playback.

According to an aspect of the present disclosure, an apparatus is provided including a processor and at least one memory coupled to the processor, the processor being configured to receive a processed first audio content from a first user based on a first viewing direction for the first user facing at least one first section of an audiovisual content and on a second viewing direction for a second user facing at least one second section of the audiovisual content and output the processed first audio content for audio playback.

According to an aspect of the present disclosure, a computer-readable storage medium is provided carrying a software program including program code instructions for receiving a first audio content from a first user, processing the first audio content based on a first viewing direction for the first user facing at least one first section of an audiovisual content and on a second viewing direction for a second user facing at least one second section of the audiovisual content and providing the processed first audio content.

According to an aspect of the present disclosure, a computer-readable storage medium is provided carrying a software program including program code instructions for receiving a processed first audio content from a first user based on a first viewing direction for the first user facing at least one first section of an audiovisual content and on a second viewing direction for a second user facing at least one second section of the audiovisual content and outputting the processed first audio content for audio playback.

According to an aspect of the present disclosure, a non-transitory article of manufacture is provided tangibly embodying computer readable program code instructions which, when executed, cause a computer to receive a first audio content from a first user, process the first audio content based on a first viewing direction for the first user facing at least one first section of an audiovisual content and on a second viewing direction for a second user facing at least one second section of the audiovisual content and provide the processed first audio content.

According to an aspect of the present disclosure, a non-transitory article of manufacture is provided tangibly embodying computer readable program code instructions which, when executed, cause a computer to receive a processed first audio content from a first user based on a first viewing direction for the first user facing at least one first section of an audiovisual content and on a second viewing direction for a second user facing at least one second section of the audiovisual content and output the processed first audio content for audio playback.

According to one aspect of the present disclosure, a computer program product, including code instructions executable by a processor for receiving a first audio content from a first user, processing the first audio content based on a first viewing direction for the first user facing at least one first section of an audiovisual content and on a second viewing direction for a second user facing at least one second section of the audiovisual content and providing the processed first audio content.

According to one aspect of the present disclosure, a computer program product, including code instructions executable by a processor for receiving a processed first audio content from a first user based on a first viewing direction for the first user facing at least one first section of an audiovisual content and on a second viewing direction for a second user facing at least one second section of the audiovisual content and outputting the processed first audio content for audio playback.

The above presents a simplified summary of the subject matter in order to provide a basic understanding of some aspects of subject matter embodiments. This summary is not an extensive overview of the subject matter. It is not intended to identify key or critical elements of the embodiments or to delineate the scope of the subject matter. Its sole purpose is to present some concepts of the subject matter in a simplified form as a prelude to the more detailed description that is presented later.

Additional features and advantages of the present disclosure will be made apparent from the following detailed description of illustrative embodiments which proceeds with reference to the accompanying figures.

BRIEF DESCRIPTION OF THE DRAWINGS

The present disclosure may be better understood in accordance with the following exemplary figures briefly described below.

DETAILED DISCUSSION OF THE EMBODIMENTS

Figure 1:
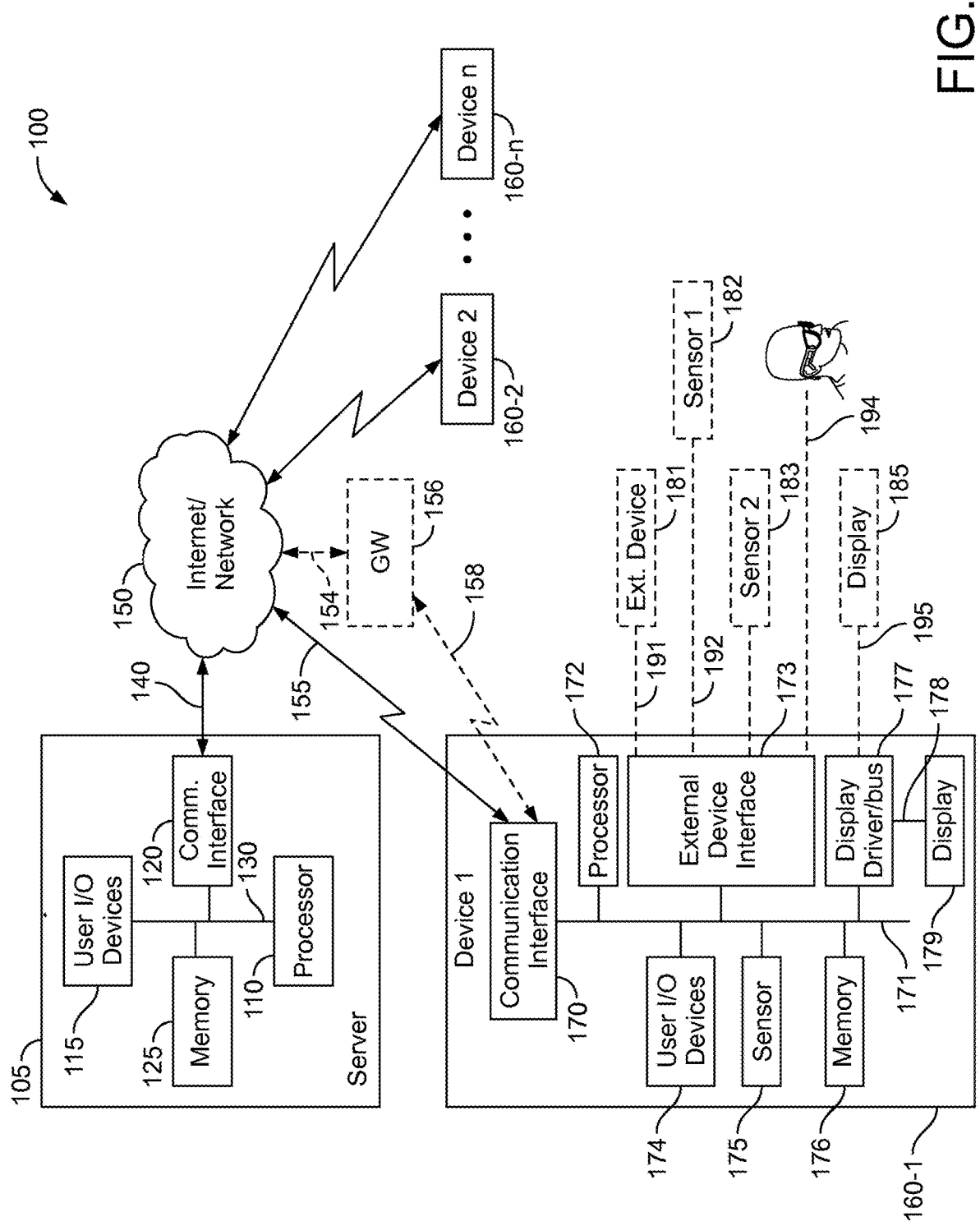
FIG. 1 illustrates a simplified block diagram of an exemplary immersive reality system in accordance with an embodiment of the present disclosure.

It should be understood that the elements shown in the figures may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with, through one or more intermediate components. Such intermediate components may include both hardware and software based components.

The present description illustrates the principles of the present disclosure. It will thus be appreciated that those skilled in the art will be able to devise various arrangements that, although not explicitly described or shown herein, embody the principles of the disclosure and are included within its scope.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

It is to be understood that the figures and descriptions have been simplified to illustrate elements that are relevant for a clear understanding of the present disclosure, while eliminating, for purposes of clarity, many other elements found in typical encoding and/or decoding devices.

It will be understood that, although the terms first and second may be used herein to describe various elements, these elements should not be limited by these terms. These terms are only used to distinguish one element from another. Various methods are described above, and each of the methods includes one or more steps or actions for achieving the described method. Unless a specific order of steps or actions is required for proper operation of the method, the order and/or use of specific steps and/or actions may be modified or combined.

In the following sections, the words "image", "picture" and "frame" may be used interchangeably.

At least one embodiment of the present disclosure is directed to immersive reality (IR) systems, hereby including at least one of virtual reality, augmented reality, augmented virtuality, mixed reality, merged reality, etc. At least one embodiment of the present disclosure is directed to social interactions among users sharing an IR experience (e.g., watching the same IR content). In particular, at least one embodiment of the present disclosure is directed to providing and/or receiving audio content among users sharing an IR experience.

When two or more individuals, each having their own IR viewer or HMD, watch synchronized presentations of an immersive media, each could look around independently as the presentation proceeds. However, as a social experience, their interactions may be awkward, perhaps depending on content. For example, in a roller coaster experience, each is likely to remain facing forward, more or less, watching what is in front of the roller coaster vehicle. But this might not always be the case. One or another of the users might glance off to the side and spy something of interest. A comment like, "Look at that!" by one user is likely to confuse the other(s). In the case of the roller coaster, a substitute comment like, "Wow, look to the right!" might resolve the issue, but relies on the speaking user to have experience with the kinds of spatially referential ambiguities and to specifically choose the statement to minimize ambiguity. In this case, the crude relative directions of "to the right" or "to the left" would be intuitively understood to be relative to the roller coaster vehicle, which has a forward facing, and thus a left and right facing, too.

In an immersive media experience lacking such a clear reference point, the user saying "Wow, look to the right!" wouldn't know and shouldn't expect that the other user(s) is(are) looking in any particular direction. For example, if a second user already happened to be looking in the intended direction, the utterance would cause the second user to look away—too far to the right. In the middle of a forest scene, "Wow, look at the rock!" may or may not be clear depending on how many rocks there are in the scene and whether any of them are in the field of view determined by the second user's facing or viewing direction or gaze direction. The second user could be flummoxed by ambiguities: Where to look if there are no rocks visible, or which rock if there are multiple rocks, or studying a rock and finding nothing of interest if the single, visible rock is the wrong one.

Accordingly, immersive media experiences such as provided in 3 DoF VR or general 360° IR, when presented to multiple users simultaneously, create a need for a way for those users to be able to communicate more clearly, with less ambiguity, particularly with respect to conversations relating to the environment presented in the VR. The present disclosure provides a technique that attempts to solve some of the shortcomings associated with the prior art. According to the present disclosure, the facing or viewing direction of each user (or viewer) within an IR environment is taken into consideration when the user communicates with other users. In the following, embodiments according to the present disclosure are described using an exemplary 360° IR experience (for which one example is 3 DoF VR), but they may similarly apply to any multi user IR system.

FIG. 1 illustrates a simplified block diagram of an exemplary immersive reality system 100 in accordance with an embodiment of the present disclosure. System 100 may process immersive reality content, e.g., virtual reality, augmented reality, augmented virtuality, mixed reality, merged reality, etc. System 100 may include a server or service provider 105 which is capable of receiving and processing user requests from one or more of user devices 160-1 to 160-n. The server 105 may be, for example, a content server. The content server, in response to a user request for content, may provide program content including various multimedia assets such as, but not limited to, movies or TV shows for viewing, streaming or downloading by users using the devices 160-1 to 160-n, or coupled to the devices 160-1 to 160-n. The devices 160-1 to 160-n may be any consumer electronic device, e.g., a gateway, a settop box, a television, a computer, a laptop, a tablet, a smart phone, etc. The server or service provider may provide other services besides content delivery.

Various exemplary user devices 160-1 to 160-n may communicate with the exemplary server 105 and/or each other (e.g., in a multi-user VR game or AR experience) over a communication network 150 such as the Internet, a wide area network (WAN), and/or a local area network (LAN). Server 105 may communicate with user devices 160-1 to 160-n in order to provide and/or receive relevant information such as recommendations, user ratings, metadata, web pages, media contents, sales offers, sales requests, etc., to and/or from user devices 160-1 to 160-n thru the network connections. Server 105 may also provide additional processing of information and data when the processing is not available and/or capable of being conducted on the local user devices 160-1 to 160-n. As an example, server 105 may be a computer having a processor 110 such as, e.g., an Intel processor, running an appropriate operating system such as, e.g., Windows 2008 R2, Windows Server 2012 R2, Linux operating system, etc. According to the present disclosure, processor 110 may execute software to perform and control the various functions and components of server 105.

FIG. 1 also illustrates further details of server or service provider 105. Processor 110 may control the various functions and components of the server 105 via a control bus 130. Server 105 may also include a memory 125 which may represent at least one of a transitory memory such as RAM, and a non-transitory memory such as a ROM, a Hard Disk Drive (HDD), a Compact Disk (CD) drive or Digital Video Disk (DVD) drive, and/or a flash memory, for processing and storing different files and information as necessary, including computer program products and software, webpages, user interface information, user profiles, user recommendations, user ratings, metadata, electronic program listing information, databases, search engine software, etc., as needed. Search engine and recommender software may be stored in the non-transitory memory 125 of server 105, as necessary, so that media recommendations may be provided, e.g., in response to a user's profile and rating of disinterest and/or interest in certain media assets, and/or for searching using criteria that a user specifies using textual input (e.g., queries using "sports", "adventure", "Angelina Jolie", etc.).

In addition, a server administrator may interact with and configure server 105 to run different applications using different user input/output (I/O) devices 115 as well known in the art. The user I/O or interface devices 115 of the exemplary server 105 may represent e.g., a mouse, touch screen capabilities of a display, a touch and/or a physical keyboard for inputting user data. The user interface devices 115 of the exemplary server 105 may also include a speaker or speakers, and/or other user indicator devices, for outputting visual and/or audio sound, user data and feedback.

Furthermore, server 105 may be connected to network 150 through a communication interface 120 for communicating with other servers or web sites (not shown) and one or more user devices 160-1 to 160-n, as shown in FIG. 1. The communication interface 120 may also represent television signal modulator and RF transmitter in the case when the content provider 105 represents a television station, cable or satellite television provider, or other wireless content provider. In addition, one skilled in the art would readily appreciate that other well-known server components, such as, e.g., power supplies, cooling fans, etc., may also be needed, but are not shown in FIG. 1 to simplify the drawing.

User devices 160-1 to 160-n may be immersive reality video rendering devices including one or more displays. The device may employ optics such as lenses in front of each display. The display may also be a part of the immersive display device such as, for example, in the case of smartphones or tablets. In another embodiment, displays and optics may be embedded in a helmet, in glasses, or in a wearable visor which are a part of the device or coupled to the device. The immersive video rendering or user device 160-1 to 160-n may also include one or more sensors and/or external auxiliary devices, as further described below.

User devices 160-1 to 160-*n* may be one or more of but are not limited to, e.g., a PC, a laptop, a tablet, a smart phone, a smart watch, a video receiver, a smart television (TV), an HMD device or smart glasses (such as, e.g., Oculus Rift (from Oculus VR), PlayStation VR (from Sony), Gear VR (from Samsung), Google Glass (from Google), Moverio BT-200 (from Epson), CastAR, Laster SeeThru, etc.), a set-top box, a gateway, or the like. An example of such devices may be, e.g., a Microsoft Windows 10 computer/tablet/laptop, an Android phone/tablet, an Apple IOS phone/tablet, a Sony TV receiver, or the like. A simplified block diagram of an exemplary user device according to the present disclosure is illustrated in block 160-1 of FIG. 1 as Device 1, and is further described below. Similar components and features may also be present in the other user devices 160-2 to 160-*n* in FIG. 1.

User device 160-1 may be directly coupled to network/Internet 150 by wired or wireless means through connection or link 155, or through gateway 156 and connections or links 154 and 158. User device 160-1 may include a processor 172 representing at least one processor for processing various data and signals, and for controlling various functions and components of the device 160-1, including video encoding/decoding and processing capabilities in order to play, display, and/or transport video content. The processor 172 may communicate with and controls the various functions and components of the device 160-1 via a control bus 171.

User device 160-1 may also include a display 179 which is driven by a display driver/bus component 177 under the control of processor 172 via a display bus 178. The display 179 may be a touch display. In addition, the type of the display 179 may be, e.g., Liquid Crystal Display (LCD), Light Emitting Diode (LED), Organic Light Emitting Diode (OLED), etc. In addition, an exemplary user device 160-1 according to the present disclosure may have its display outside of the user device, or an additional or a different external display may be used to display the content provided by the display driver/bus component 177. This is illustrated, e.g., by an exemplary external display 185 which is connected through an external display connection 195 of device 160-1. The connection may be a wired or a wireless connection.

Exemplary user device 160-1 may also include a memory 176 which may represent at least one of a transitory memory such as a RAM, and a non-transitory memory such as a ROM, an HDD, a CD drive, a DVD drive, and/or a flash memory, for processing and storing different files and information as necessary, including computer program products and software (e.g., as represented by flowchart diagrams 700 of FIG. 7 and 800 of FIG. 8 to be later described in detail), webpages, user interface information, databases, etc., as needed. In addition, device 160-1 may also include a communication interface 170 for coupling and communicating to/from server 105 and/or other devices, via, e.g., the network 150 using the link 155, Communication interface 170 may also couple device 160-1 to gateway 156 using the link 158. Links 155 and 158 may represent a connection through, e.g., an Ethernet network, a cable network, a FIOS network, a Wi-Fi network, and/or a cellphone network (e.g., 3G, 4G, LTE, 5G), etc.

One function of an immersive content rendering or user device 160-1 may be to control a virtual camera which captures at least a part of the content structured as a virtual volume. The system may include one or more pose tracking sensors which totally or partially track the user's pose, for example, the pose of the user's head or the facing, viewing or gaze direction of the user, in order to process the pose of the virtual camera. One or more positioning sensors may be provided to track the displacement of the user, for example, identifying the location or position of the user within the immersive reality. Sensor data that identifies viewing pose, viewing direction and/or location is then processed to associate (or translate) the physical or real space (where the user's actions actually happen) with (to) the virtual or immersive space (where the user's actions are meant or intended to happen). The system may also include other sensors related to the environment for example to measure lighting, temperature or sound conditions. Such sensors may also be related to the body of a user, for instance, to detect or measure sweating or heart rate. Information acquired through these sensors may be used to process the content.

According to the present disclosure, an exemplary device 160-1 may also include a sensor 175. In an exemplary embodiment, sensor 175 may be at least an audio sensor such as a microphone, a visual sensor such as a camera (video or picture), a gyroscope, a fluxgate compass, an accelerometer, a compass, a motion detector, a wearable hand/leg/arm/body band, a glove, a Global Positioning System (GPS) sensor, a Wi-Fi location tracking sensor, a Radio Frequency Identification (RFID) tag (or tracking tag), and/or other types of sensors as previously described.

In another non-limiting embodiment according to the present disclosure, an exemplary external sensor 182, 183 may be separate from and coupled to the user device 160-1 (e.g., placed in the room walls, ceiling, doors, inside another device, on the user, etc.). The exemplary external sensor(s) 182, 183 may have wired or wireless connections 192,193, respectively, to the device 160-1 via an external device interface 173 of the device 160-1, as shown in FIG. 1. External sensor(s) 182, 183 may be, e.g., a microphone, a visual sensor such as a camera (video or picture), a gyroscope, an accelerometer, a compass, a motion detector, a wearable hand/leg/arm/body band, a glove, a Global Positioning System (GPS) sensor, a Wi-Fi location tracking sensor, a Radio Frequency Identification (RFID) tag (or tracking tag), etc. In accordance with the present disclosure, sensor data, e.g., from sensor 175, 182 and/or 183, may be provided to processor 172 of user device 160-1 via processor bus 171 for further processing.

The processor 172 may process the signals received from the sensor 175, 182, 183. Some of the measurements from the sensors may be used to compute the pose and/or position of the device and to control the virtual camera. Sensors which may be used for pose or position estimation include, for instance, gyroscopes, accelerometers or compasses. In more complex systems, a rig of cameras for example may also be used. The processor 172 may perform image processing to estimate the pose of an HMD. Some other measurements may be used to process the content according to environmental conditions or user reactions. Sensors used for detecting environment and user conditions include, for instance, one or more microphones, light sensor or contact sensors. More complex systems may also be used such as, for example, a video camera tracking eyes of a user. In such a case, the at least one processor 172 performs image processing to perform the expected measurement.

In addition, exemplary device 160-1 may also include user input/output (I/O) devices 174. The user I/O or interface devices 174 of the exemplary device 160-1 may represent e.g., a mouse, a remote control, a joystick, a touch sensitive surface (e.g. a touchpad or a tactile screen), touch screen capabilities of a display (e.g., display 179 and/or 185), a touch screen and/or a physical keyboard for inputting user data. The user interface devices 174 of the exemplary device 160-1 may also include a speaker or speakers, and/or other user indicator devices, for outputting visual and/or audio sound, user data and feedback. Information from user input devices may be used to process the content, manage user interfaces or to control the pose of the virtual camera.

It is to be understood that sensors 175, 182, 183 and user input devices 174 communicate with the processor 172 within the immersive rendering or user device 160-1 through wired or wireless communication interfaces.

In another non-limiting exemplary embodiment in accordance with the present disclosure, as shown in FIG. 1, device 160-1 may be coupled to at least one external or auxiliary device 181, via external device interface 173 and link 191. Device 181 may be, e.g., a smart phone, a tablet, a remote control, a keyboard device, etc. The external device 181 may include a touch sensitive surface (e.g. a touchpad or a tactile screen) to be utilized as a user interface (UI).

In another non-limiting exemplary embodiment in accordance with the present disclosure, as shown in FIG. 1, device 160-1 may be coupled to an immersive reality HMD device or smart glasses 184 (such as, e.g., Oculus Rift (from Oculus VR), PlayStation VR (from Sony), Gear VR (from Samsung), Google Glass (from Google), Moverio BT-200 (from Epson), CastAR, Laster SeeThru, etc.), via external device interface 173 and link 194. Notice that user device 160-1 may itself be an HMD device or smart glasses. Besides the inherent display, in one embodiment, the HMD device may include at least one embedded camera which may be utilized as a sensor, e.g., for localization (when observing the surroundings) or for user recognition when pointed to the user's eye (e.g., iris recognition). In one embodiment, the HMD device may also include an embedded microphone which may be utilized as a sensor or as a voice interface to accept voice commands. In one embodiment, the HMD device may also include a headphone or earbuds for providing audio.

A typical HMD has one or two small displays, with lenses and semi-transparent mirrors embedded in eyeglasses (also termed data glasses), a visor, or a helmet. The display units are miniaturized and may include cathode ray tubes (CRT), liquid crystal displays (LCDs), liquid crystal on silicon (LCos), or organic light-emitting diodes (OLED). Some vendors employ multiple micro-displays to increase total resolution and field of view.

HMDs differ in whether they can display only computer-generated imagery (CGI) or VR content, or only live imagery from the physical world, or a combination. Most HMDs can display only a computer-generated image, sometimes referred to as a virtual image. Some HMDs can allow a CGI to be superimposed on a real-world view (AR, mixed reality, merged reality, etc.) Combining real-world view with CGI can be done by projecting the CGI through a partially reflective mirror and viewing the real world directly. This method is often called optical see-through. Combining real-world view with CGI can also be done electronically by accepting video from a camera and mixing it electronically with CGI. This method is often called video see-through.

Continuing with FIG. 1, exemplary user devices 160-1 to 160-n may access different media assets, recommendations, web pages, services or databases provided by server 105 using, e.g., Hypertext Transfer Protocol (HTTP). A well-known web server software application which may be run by server 105 to service the HTTP protocol is Apache HTTP Server software. Likewise, examples of well-known media server software applications for providing multimedia programs include, e.g., Adobe Media Server and Apple HTTP Live Streaming (HLS) Server. Using media server software as mentioned above and/or other open or proprietary server software, server 105 may provide media content services similar to, e.g., Amazon, Netflix, or M-GO as noted before. Server 105 may also use a streaming protocol such as e.g., Apple HTTP Live Streaming (HLS) protocol, Adobe Real-Time Messaging Protocol (RTMP), Microsoft Silverlight Smooth Streaming Transport Protocol, etc., to transmit various programs including various multimedia assets such as, e.g., movies, TV shows, software, games, electronic books, electronic magazines, etc., to the end-user device 160-1 for purchase and/or viewing via streaming, downloading, receiving or the like.

In one non-limiting exemplary embodiment of the present disclosure, the sensor or sensors 175, 182 and/or 183 may also be connected to the server or service provider 105 by wired (e.g., Ethernet cable) or wireless (e.g., 802.11 standards or Bluetooth) means (e.g., LAN or WAN network) and processor 110 may remotely process some or all of the sensor data.

It is to be understood that the connections or links in FIG. 1, including 140, 155, 154, 158 and 191-195 may each independently be a wired or a wireless connection.

It is to be understood that the various individual components of system 100 in FIG. 1 may be well-known circuits or mechanical components by a person of ordinary skill in the pertinent art and will not be described in detail. It is to be further understood that the example described in FIG. 1 is not exhaustive and other arrangements may be chosen without departing from the scope of the present disclosure.

Figure 2:
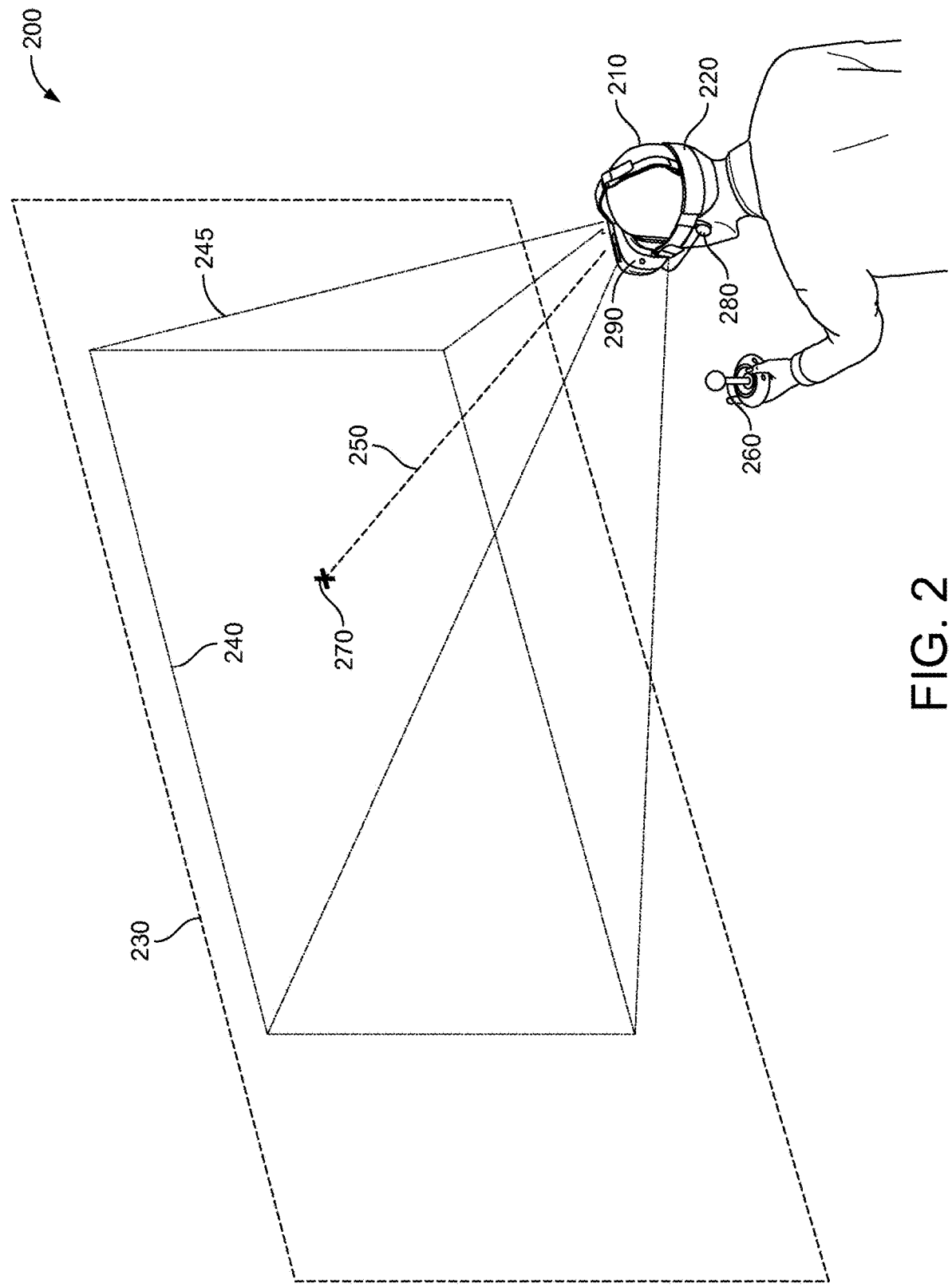
FIG. 2 illustrates a user interacting with a head-mounted display device in accordance with an embodiment of the present disclosure.

FIG. 2 illustrates drawing 200 of user 210 interacting with HMD device or IR glasses 220 in accordance with an embodiment of the present disclosure. HMD device 220 may be similar to device 184 of FIG. 1 and coupled to device 160-1, or may be similar to device 160-1 itself including HMD functionality 184, as previously explained. Optionally, user 210 may utilize a handheld device 260 (e.g., a remote control, joystick, wand, etc.) coupled to and/or controlling the operation of HMD 220. Handheld device 260 may be a device similar to device 181, user I/O device 174 or sensor 182,183. Optionally, user 210 may also utilize a headphone, an earphone, or ear buds 280 and a microphone 290. Moreover, speakers may replace the headphone and be placed somewhere else in the room. Furthermore, the microphone 290 may also be placed somewhere else in the room.

The handheld device 260 and the HMD 220 may be coupled to a server (not shown in FIG. 2) which may control what is displayed on HMD 220. The IR content displayed on the HMD 220 may depend on the relative position and orientation of the HMD. User 210 watches at least a section 240 of the IR content 230 (or field of view 245 in case of augmented, merged or mixed reality content). As the HMD 220 is moved, its new location or orientation may be sent to the server and the server may update the displayed content. Line 250 represents a viewing or gaze direction leading to virtual point 270, which is at the intersection of the viewing direction 250 and viewing section 240. Note that line 250 may be seen as a vector pointing to virtual point 270. Virtual point 270 may be the center of the viewing section 240, or it may be determined by other means. For example, virtual point 270 may be an object on viewing section 240 which is being observed by user 210. The determination may be based on data from a sensor focused on the eye movement of user 210.

With respect to FIG. 1, many combinations of devices are possible that reflect FIG. 2. For example, the server may be device 160-1, HMD 220 may be device 184 and handheld device 260 may be external device 181. In another example, the server may be gateway 156, HMD 220 may be device 160-1 and handheld device 230 may be sensor 182 or 183. In yet another example, the server may be remote server 105, HMD 220 may be device 181 or 184 and handheld device 230 may be device 160-1. Other combinations are also possible without departing from the scope of the present disclosure.

The server may track the motion of HMD 220. Using the position and orientation or direction (e.g., viewing direction) of the HMD 220, the server may calculate the portion (position and scale) of the IR field of view that needs to be displayed on the HMD 220. It is to be understood that the server may be a separate device, or it may be the HMD 220.

FIG. 2 includes a field of view 240 for HMD 220 which represents a section of the IR content 230. User 210 may move its head in order to move the field of view "window" 240 within the wider field of view 230 of the IR content. Moreover, user 210 may zoom in/out the content via settings and/or gestures (e.g., using handheld device 260), or moving HMD 220 (or user's body) in a desired direction. In one embodiment, zooming in/out may be taken into consideration in the field of view 240 determination, in real time. In one embodiment, zooming in/out may not be taken into consideration in the field of view 240 determination, and the field of view 240 determination for the HMD 220 may be made according to a determined amount of zoom. The determined amount of zoom may be established by the user.

It is to be understood that the field of view 240 may be detected or determined from images by at least one video camera and/or data from sensors attached to or included in the HMD 220, or by other cameras and/or sensors coupled to the system, e.g., sensors 182, 183 and 175 in FIG. 1. Similarly, the field of view 240 may be detected or determined from images by at least one video camera and/or data from sensors attached to or included in the handheld device 260, or by other cameras or sensors coupled to the system, e.g., sensors 182, 183 and 175 in FIG. 1. The images in IR content 230 and 240 may be 2D or 3D images. The sensors may detect direction, movement and/or position of the respective devices and/or users.

The IR content may be VR content, AR content, mixed content, merged content, etc. HMD device 220 may operate differently depending on the type of IR content. In addition, HMD device 220 may operate in one of the following modes: optical see-through mode, video see-through mode or mixed optical-video see-through mode. With optical-see-through HMDs, the real world is seen through semi-transparent mirrors placed in front of the user's eyes. These mirrors are also used to reflect the computer-generated images into the user's eyes, thereby combining the real- and virtual-world views. With a video see-through HMD, the real-world view is captured with two miniature video cameras mounted on the head gear, and the computer-generated images are electronically combined with the video representation of the real world.

According to the present disclosure, the facing, viewing or gaze direction of each user (or viewer) within an IR environment is taken into consideration when the user communicates with other users. In one embodiment, when a first user speaks, the voice of the first user may be captured, along with data representing the current facing or viewing direction of the first user within the IR environment. Presentation of that captured voice to a second user may be based on the difference between the facings of the first and second users, so that the captured voice appears to the second user to come from the direction in the IR environment corresponding to where the first user is currently facing. More specifically, the captured voice may appear to the second user to come from the virtual point 270 representing the intersection of the first user's viewing direction 250 with the section of IR content 240 viewed by the first user 210. Note that virtual point 270 associated with the first user 210 may not be included in the section of IR content viewed by the second user at the moment the first user speaks. If the first user moves or turns his head after he speaks, a new viewing direction 250 and a new virtual point 270 is determined and any new captured voice will be associated with the new virtual point 270.

Figure 3:
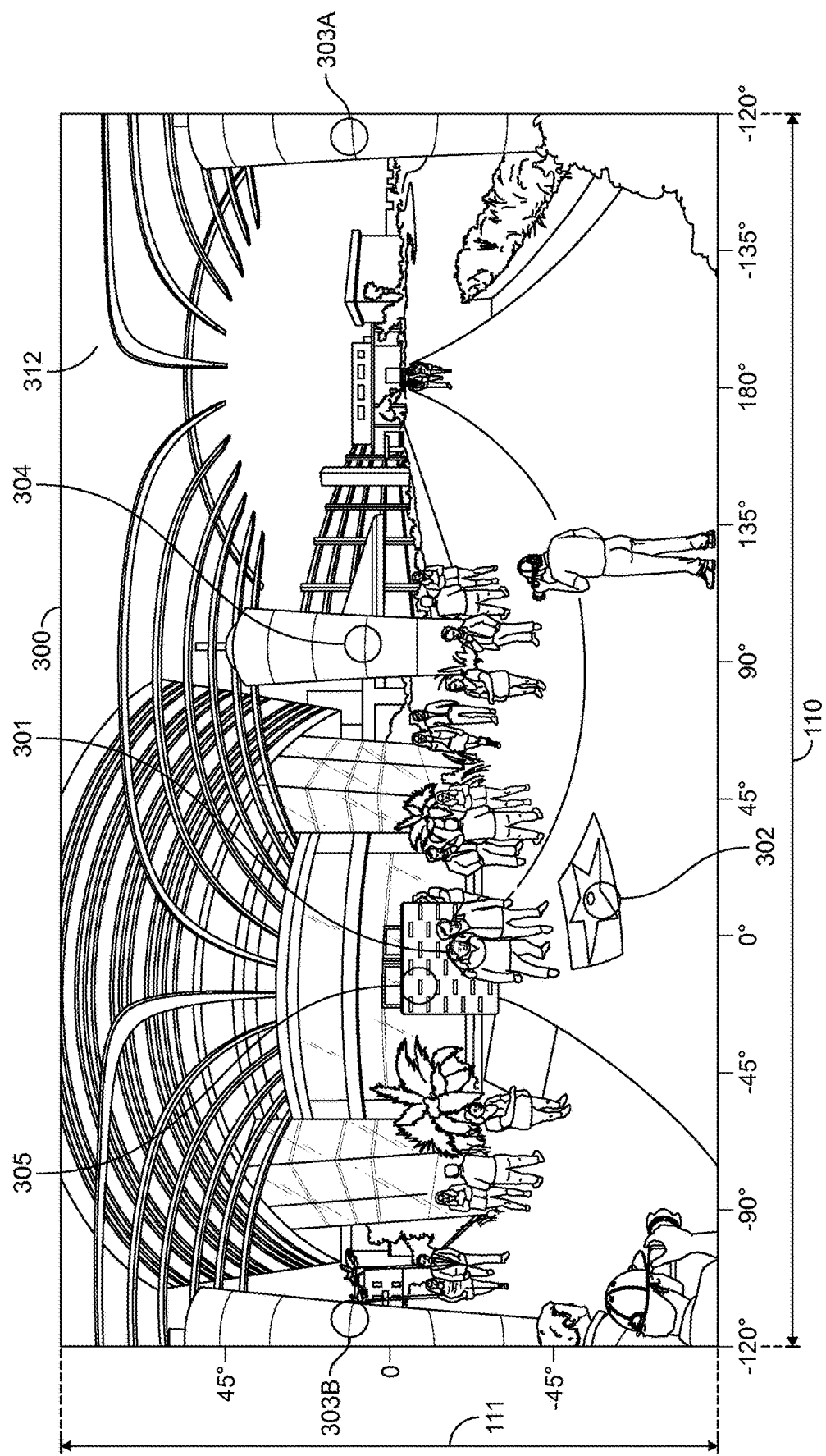
FIG. 3 illustrates a drawing of a 360° flat view suitable for presentation as immersive reality content in accordance with an embodiment of the present disclosure.

FIG. 3 illustrates a drawing 300 of a 360° view suitable for presentation as immersive reality content in accordance with an embodiment of the present disclosure. Immersive media 300 may be a still image or a single frame of a 360° video. Many formats for 360° media are known. FIG. 3, by way of example and not of limitation illustrates media 300 in "equirectangular" format, where each pixel of media 300 lies at a particular azimuth angle indicated by horizontal axis label 310, and a particular elevation angle indicated by vertical axis label 311. In media 300, the equirectangular representation gives the portions of the view that get mapped to the high and low extremes of elevation a disproportionately large share of the image, as seen where overhead beam 312 becomes fat and stretches across half of the image near the top. Other formats are known, including a cube format (not shown), where the composite view surrounding the viewpoint is mapped to the six faces of a cube centered at the viewpoint, resulting in a more uniform distribution of the view (e.g., in terms of solid angles) to the media (e.g., in terms of pixels). Others formats also include tetrahedral, dodecahedral, etc. But for simplicity and clarity of explanation, rather than representational efficiency, equirectangular was chosen for this explanation.

In the case of media 300, a center of interest 301 is a particular celebrity receiving a Hollywood Walk of Fame® star 302. In this example, center of interest 301 is located at azimuth 0°, at an elevation of about −20°. By way of demonstration, media 300 represents a 360° environment: a right-hand portion of a first pillar 303B is visible at the left edge of media 300 at the split at azimuth of −105°. The left-hand portion of the first pillar 303A is visible at the right edge of media 300. An additional item of interest, a second pillar 304, is located at an azimuth of about 90°. Another item of interest is a panel 305 behind celebrity 301. Note that in this example, the azimuth increases on a clockwise direction and that the range 180° to 360° is equivalent to −180° to 0°, respectively.

In one embodiment, the location of center of interest 401 may be represented in media 300 by metadata. In other embodiments, the center of interest may, by convention, be established at azimuth=0° and elevation 0°, or other predetermined values. In those embodiments that establish a center of interest either by convention or with metadata, the center of interest represents the initial facing or viewing direction of a user within the VR environment. In other embodiments, metadata may establish an absolute orientation for the VR environment, e.g., if a VR-based star map in the sky is to be presented in actual alignment with the celestial sphere overhead. This may also be the case for augmented reality (AR) embodiments as well as mixed and merged reality embodiments according to the present disclosure.

Figure 4:
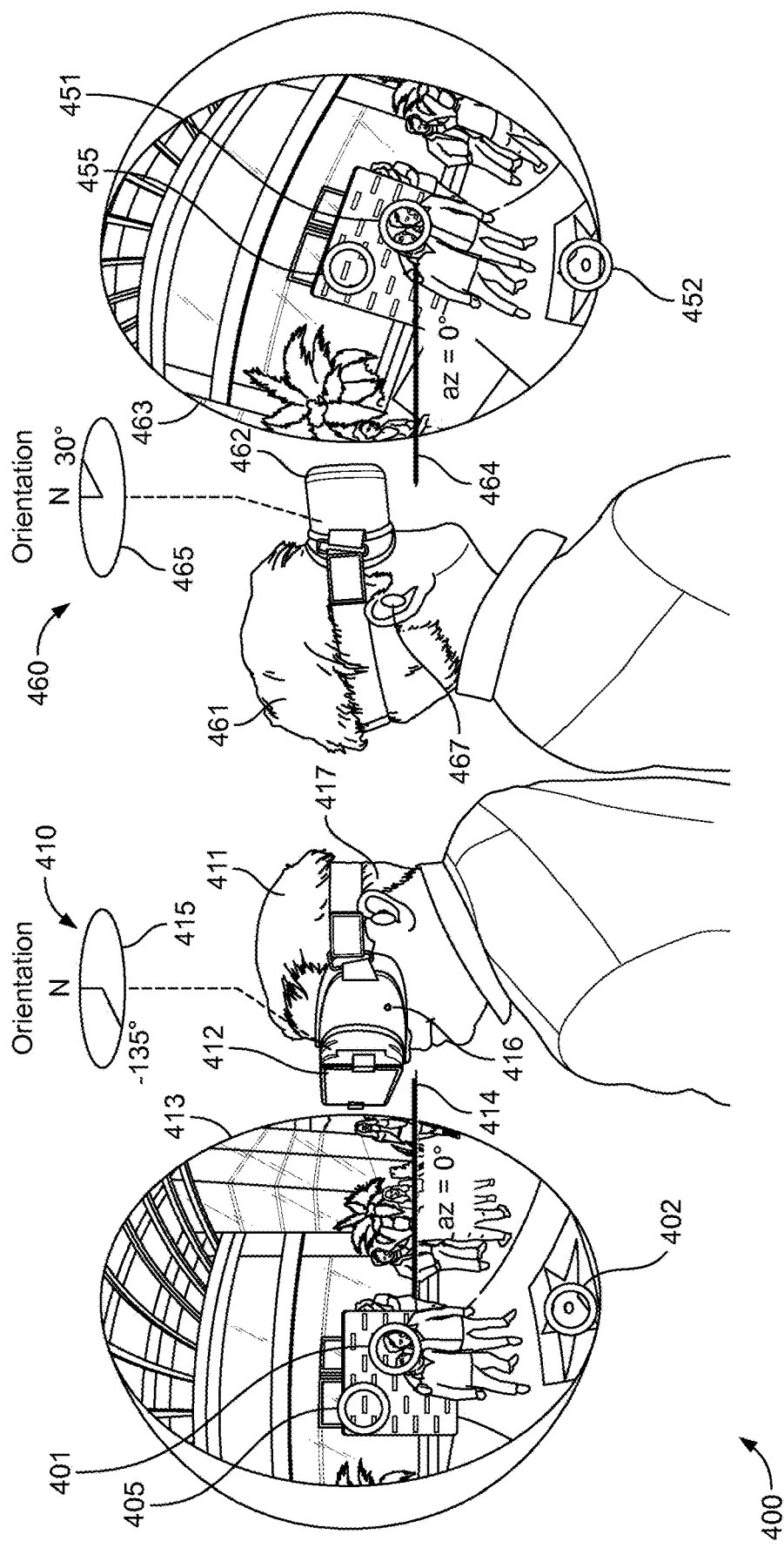
FIG. 4 illustrates a drawing of users interacting in an immersive reality system in accordance with an embodiment of the present disclosure.

FIG. 4 illustrates a drawing 400 of users interacting in an immersive reality system in accordance with an embodiment of the present disclosure. The two users 411 and 461 are participating in a shared IR experience 400, including first user experience 410 and second user experience 460, both based on media 300. User experiences 410 and 460 may be in physically close proximity, e.g., in the same room or building, though perhaps not as close as shown in FIG. 4 (which is done for convenience of illustration). Alternately, the two user experiences 410 and 460 may be arbitrarily remote, e.g., utilizing a connection over the Internet. User experiences 410 and 460 may each be similar to the IR experience depicted in FIG. 2 for user 210. Moreover, FIG. 4 illustrates user experiences in an IR system similar to the system of FIG. 1.

For the sake of simplicity, it is assumed in this example that the elevation is 0° throughout, both in the physical space and in the virtual space, however, the orientation or viewing direction may include azimuth and elevation as described in FIG. 3. The azimuth accounts for user's gaze to the left or to the right. The elevation accounts for user's gaze looking up or down. Ultimately, the viewing direction is a vector (e.g., 250) pointing to the virtual point (e.g., 270) and it may have any direction, depending on the type of content. For example, the 360° view (e.g., 300) may wrap around in the elevation or vertical axis (e.g., 311) as well.

In first user experience 410, the first user 411 wears an HMD 412 similar to HMD 184 and 220. An orientation sensor (not shown) associated with or coupled to HMD 412 (similar to, e.g., sensors 175, 182 or 183) detects the orientation of the first user 411 in the real or physical world or space. In the example of FIG. 4, the orientation of the first user 411 is represented as a real-world orientation detection 415, indicating an azimuth of −135° from magnetic north. This real-world orientation detection 415 is recorded as a first initial physical orientation. In first user experience 410, the initial physical orientation of −135° azimuth is assigned the initial azimuth 414 of 0° in the IR environment 413 presented to user 411 by HMD 412. In the example of FIG. 3, the azimuth of 0° corresponds to initial reference 301 in the IR media 300, but could be any predetermined initial facing within the immersive media 300. With HMD 412, user 411 sees a view into IR environment 413, including center of interest (celebrity) 401 (similar to 301), star 402 (similar to 302), and the panel 405 (similar to panel 305).

The HMD 412 is also associated with a microphone 416, which may be connected to the HMD 412, or positioned elsewhere in the room to capture the voice of user 411 when user 411 speaks. A headphone, an earphone, or ear buds 417 in the left ear of user 411 may be coupled to the HMD 412 (the right earphone of user 411 is not visible in FIG. 4). In an alternative embodiment, earphones 417 may be provided separately (e.g., as a pair of wired or wireless headphones) having connection to HMD 412. In another alternative embodiment, an array of speakers driven directly or indirectly by HMD 412 may be provided to deliver audio to user 411.

In one embodiment, the orientation sensor may include a fluxgate compass. In other embodiments, by way of example, the orientation sensor may include a vibrating structure gyroscope (VSG) (also known as a MEMS gyroscope). Though a VSG does not provide an absolute azimuth, it may provide readings representing changes in azimuth, and the changes represented by the readings may be integrated to produce a serviceable value for orientation. In still other embodiments, the orientation sensor may include one or more accelerometers, also used to detect changes in azimuth. In yet other embodiments, the orientation sensor may be an external component (i.e., not mounted in or on the HMD 412), for example including a camera that observes user 411, wherein the orientation sensor detects the facing of HMD 412 relative to the optical axis of the camera.

In second user experience 460, the second user 461 wears HMD 462, similar to HMD 184, 220 and 412. An orientation sensor (not shown), associated with HMD 462, detects the orientation of the second user in the real world, which in the example of FIG. 4 is represented as a real-world orientation detection 465, indicating an azimuth of 30° from magnetic north. This real-world orientation detection 465 is recorded as a second initial orientation. In second user experience 460, this initial orientation of 30° azimuth is assigned the azimuth 464 of 0° in the IR environment 463 presented to user 461 by HMD 462, which corresponds to the azimuth of 0° in media 100. With HMD 462, user 461 sees a view into IR environment 463, including center of interest (celebrity) 451, star 452, and panel 455 similar to 301, 302 and 305, respectively. Notice that view 463 is similar to view 413 for the two users (except for different perspectives in FIG. 4, where they are shown as mirror images of each other, since the users 411 and 461 are facing somewhat opposite directions in the real world).

The HMD 462 may also be coupled with an earphone 467 in the right ear of user 4611 (another earphone 467 in the left ear of user 461 is not seen in FIG. 4). In an alternative embodiment, earphones 227 may be provided separately (e.g., as a pair of wired or wireless headphones) having connection to HMD 222. In another alternative embodiment, an array of speakers driving directly or indirectly by HMD 222 may be provided to deliver audio to user 221.

Figure 5:
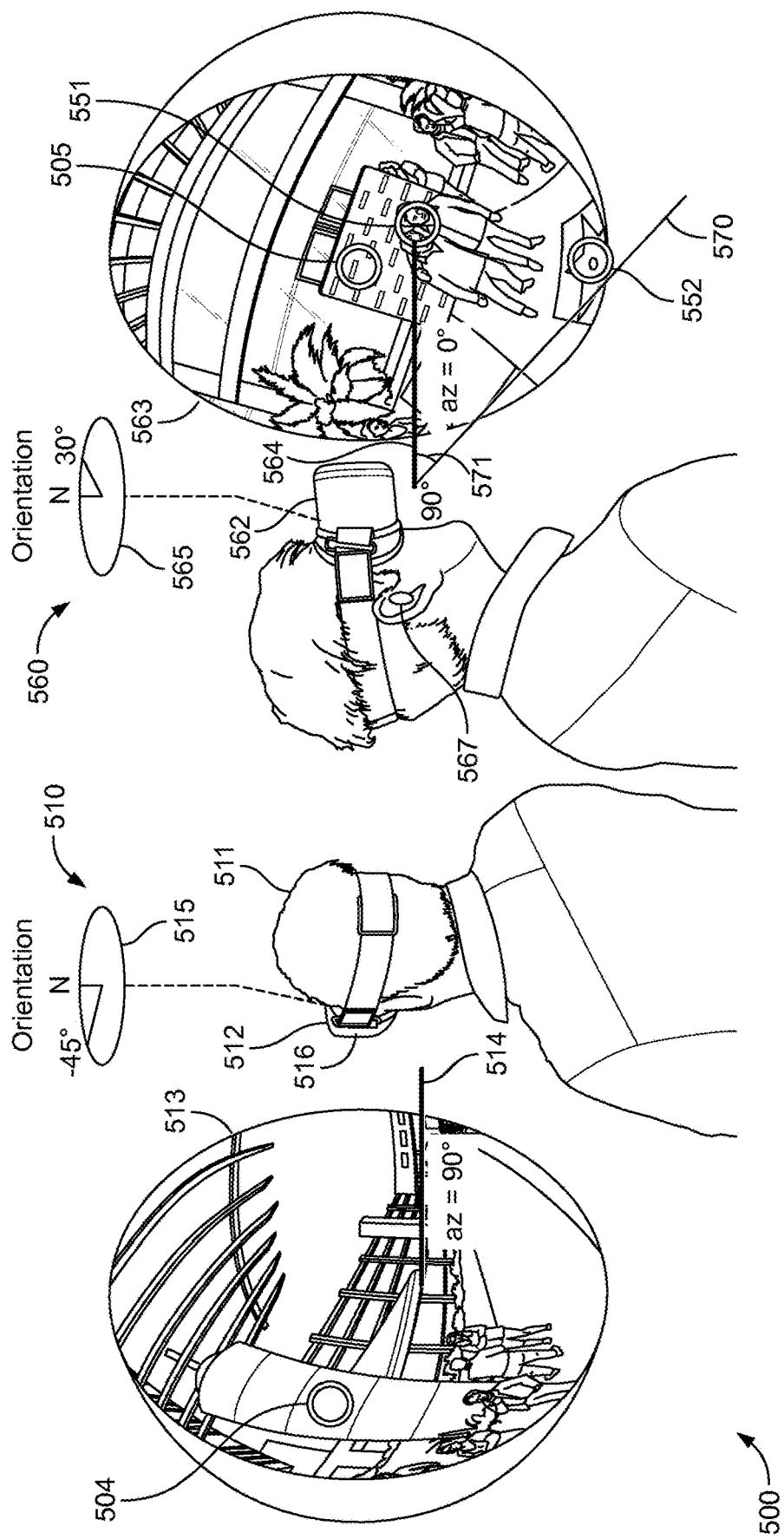
FIG. 5 illustrates a drawing of users interacting in an immersive reality system in accordance with an embodiment of the present disclosure.

FIG. 5 illustrates a drawing 500 of users interacting in an immersive reality system in accordance with an embodiment of the present disclosure. FIG. 5 is similar to FIG. 4, and numbers 501-567 correspond to numbers 401-467, respectively. FIG. 5 may be seen as a continuation of the shared IR experience of FIG. 4. Therefore, user 511 and 411 may be the same user; and users 561 and 461 may also be the same user. At this later time, experience 500 includes first user experience 510 and second user experience 560, both still based on media 300.

As in FIG. 4, and for the sake of simplicity, it is assumed in this example that the elevation is 0° throughout, both in the physical space and in the virtual space, however, the orientation or viewing direction may include azimuth and elevation as described in FIG. 3.

FIG. 5 illustrates the situation when user 511 moves or turns his head 90° to the right, with respect to the original position in FIG. 4, producing a real-world orientation that is rotated relative to the real-world orientation of user 411 in FIG. 4. The orientation sensor (still not shown) associated with HMD 512, detects the current orientation of the first user in the real world, producing a real-world orientation detection 515, in this example indicating an azimuth of −45° from magnetic north. In first user experience 510, the first initial orientation of −135° (415) is subtracted from the first current orientation of −45° azimuth (515). The resulting difference is +90°. This difference is added to the azimuth 414 of 0° assigned to the first initial orientation and results in a first current facing 514 having an azimuth of 90°, that is, view 513 is. a view −90° to the right of view 413. Accordingly, IR environment 513 is presented to user 511 by HMD 512, on the basis of first current facing 514.

Second user experience 560 is likewise a continuation of second user experience 460 at the same later time. By way of example, in second user experience 560, the head of second user 561 is not turned relative to second user 461 in second user experience 460. The orientation sensor (still not shown), associated with HMD 562, detects the current orientation of the second user in the real world and produces real-world orientation detection 565 indicating an azimuth of +30° from magnetic north. In second user experience 560, the second initial orientation of +30° (465) is subtracted from the second current orientation of +30° azimuth (565). The resulting difference is 0°, which when added to the azimuth 464 of 0° assigned to the second initial orientation, results in a second current facing 564 having an azimuth of 0° (which, because the head of user 561 has not turned, is the same facing as in user experience 460). The second current facing 564 corresponds to the azimuth 0° in media 300, so with HMD 562, user 561 still sees a view into IR environment 563 directed toward center of interest (celebrity) 551.

In one embodiment, the initial orientation (azimuth and/or elevation) of the view of each user may be physically based, rather than being based on a stored measurement; or may be continuously relative. Many diverse physically based orientation references are known. For example, a flux gate compass may detect magnetic north, and magnetic north (or some other fixed magnetic orientation) may be selected as the azimuth for an a priori initial orientation. Similarly, if an external camera rig were watching a user, the camera(s) could be the physical basis for determining orientation: The user being turned directly toward one of the camera(s) could be the initial orientation, while any turn away from the camera, in either of 4 directions (up, down, left or right), would register as a different orientation. In some implementations, the HMD may include, or the user might wear, indicia, e.g., markings or beacons, to facilitate orientation determination through the camera. In other embodiments, the indicia could be located in the physical environment surrounding the user, while a camera is worn by the user (e.g., on the HMD) such that a determination of orientation is based on observation with the camera of the environmental indicia.

Some orientation sensors, rather than reading orientation directly, detect a first or second derivative of orientation. A gyroscope may indicate change in orientation, i.e., a rotation rate. An accelerometer might indicate how quickly that rate is changing. In such cases, some form of integration is used to determine orientation from the orientation sensor readings. By way of example, using this choice, and assuming a gyroscope as an orientation sensor, the initial orientation O(t) where t=0 may be taken to be zero. The next detected movement M(t) where t=1 would produce a deviation from that initial orientation to produce a current orientation O(t) where t=1, which might be described as O(1)=O(0)+b*M(1), where 'b' is a scale factor depending on the sensor. Subsequently, the current orientation is based on accumulation of movements may be described as O(n+1)=O(n)+b*M(n+1). Accumulation of these incremental movements M(t) in this way provides the current orientation. Had the orientation sensor been an accelerometer, double integration would be used. Note that any real-world measurements, such as for changes in orientation, will contain noise and that by integration, this noise accumulates. Thus, the strict relationship between the original initial orientation and the current orientation may diverge. Methods to address such noise, in integration (and double integration) are available and well known by persons skilled in the art, such as squelching any readings representing change or acceleration below a predetermined threshold. Also, with all problems of indefinite integration, an initial constant (the "constant of integration") must be provided. The initial orientation is one such constant. In the case of double integration (as when using accelerometers), a second constant is needed, describing the initial rate of rotation. Zero is an appropriate choice if the user is relatively motionless when the measurement process begins.

In the shared IR experience of FIGS. 4 and 5, when first user 511 (or 411) speaks, the voice of first user 511 is detected (e.g., by microphone 516) and presented to second user 561 (e.g., through earphones 567) in a way that is based upon facings 514 and 564 within the shared IR experience 500, so as to appear to be coming from a direction 570 in IR environment 563 that corresponds in the shared IR environment 500 to the direction 514 in which the first user 511 is facing in IR environment 513. More particularly, the voice of first user 511 appears to the second user 561 to be coming from the virtual point 518 in view 513 of user 511, which is at the intersection of the viewing direction of user 511 and the IR view 513.

The shared IR experience begins when the first (411, 511) and second (461, 561) users have established which immersive media (e.g., 300) is the basis for their shared IR experience 400/500; when the corresponding first (412, 512) and second (462, 562) HMDs have access to that media; each of the HMDs has established a corresponding first and second initial orientation in the real-world (e.g., the reading of −135° and 30° from "N" on real-world facing detections 415 and 465, respectively), if needed for subsequently determining a current orientation; when each has associated that initial orientation to correspond to a predetermined facing within the media (in example media 300, an azimuth of 0° corresponding with center of interest 301); and when communication between the two HMDs, including synchronization if needed (e.g., for video), has been established.

After the shared IR experience begins, a first current facing 414 in virtual environment 413 is determined. In one embodiment, this is the difference between a first current real-world orientation detection 515 and the corresponding first initial orientation 415. For example, in the case of a fluxgate compass, commonly provided in smartphones to determine orientation, an azimuth reading of −135° from magnetic north (shown in FIG. 4) is established as the first initial orientation and corresponds to the azimuth of 0° in immersive media 300. Subsequently, a first current orientation reading of −45° (in FIG. 5) produces a first current facing 514 azimuth of 90°, which is the difference of the first current orientation 514 minus the first initial orientation 414.

Based on the first current facing 514, the first user is presented with the immersive content 300, rendered by first HMD 512 as virtual environment 513, such that, in this example, the first current facing 514 is directed towards pillar 504 and the buildings behind it.

Similarly, a second current facing 564 of second user 561 in virtual environment 563 is determined based on a second current orientation reading 565 and the second initial orientation 465. The second HMD 562 renders immersive content (e.g., 300) based on this second current facing 564 and presents IR environment 563 to second user 561 such that, is this example, the second current facing 564 is toward the center of interest (celebrity) 501.

As the first user 511 speaks, audio (voice) content is captured, e.g., with microphone 516. The audio content from the first user is processed and presented to the second user with an imposed directionality 570 based on difference 571 between the first facing 514 minus the second facing 564, which in FIG. 5 is (90°−0°)=90°. By so doing, the voice of user 511 appears to user 561 to originate from a direction 570 in VR environment 563 that corresponds to the first facing 514 of first user 511 in IR environment 513. The sound of the voice of user 511 thereby indicates to second user 561 where first user 511 is looking at the time of the first user's utterance. In particular, the sound of the voice of user 511 indicates to second user 561 the virtual point 518. If the user 511 continues to speak while in the same position, user 561 may move towards the same position and eventually align with user 511 in the virtual space. Similarly, the voice of user 561 may direct user 511 to turn his head so as to align himself with user 561 in the virtual space, so that they can simultaneously observe the same section of the IR content. When both users are aligned in the virtual space, as in FIG. 4 (users 411 and 461 are facing the same section of the IR content), the voice of a user is heard by the other user as if coming from the virtual point in front of the user (e.g., virtual point 270 for user 210), as will be further explained in association with FIG. 6.

In one embodiment, data representing the location or position of the first user within the IR environment may also be captured, depending on the type of IR experience. For example, when the users are allowed to move independently within the IR environment, in addition to independently changing their viewing directions, then position or location of each user may be necessary to understand the geographic relationship between users in a 3D environment. Therefore, presentation of the captured voice to a second user may be further based on the locations of the first user and the second user within the IR environment, depending on the type of IR experience. In other words, the viewing directions of the users represent vectors that do not have a common origin as in the examples of FIGS. 3, 4 and 5.

It is to be understood that other types of systems and video contents may be utilized without departing from the scope of the present disclosure. For example, the system may be an immersive system of display devices or panels surrounding at least one user to give a similar experience as the ones described in association with FIGS. 3 to 5. As a result, the at least one user may not need an HMD, but the movements and visual experience of the at least one user are similar. In addition, the system of display devices or panels may not cover 360° but just an angular section, e.g., 180°. Moreover, the video content may include other formats and may not cover 360° but just an angular section, e.g., 180°.

Figure 6:
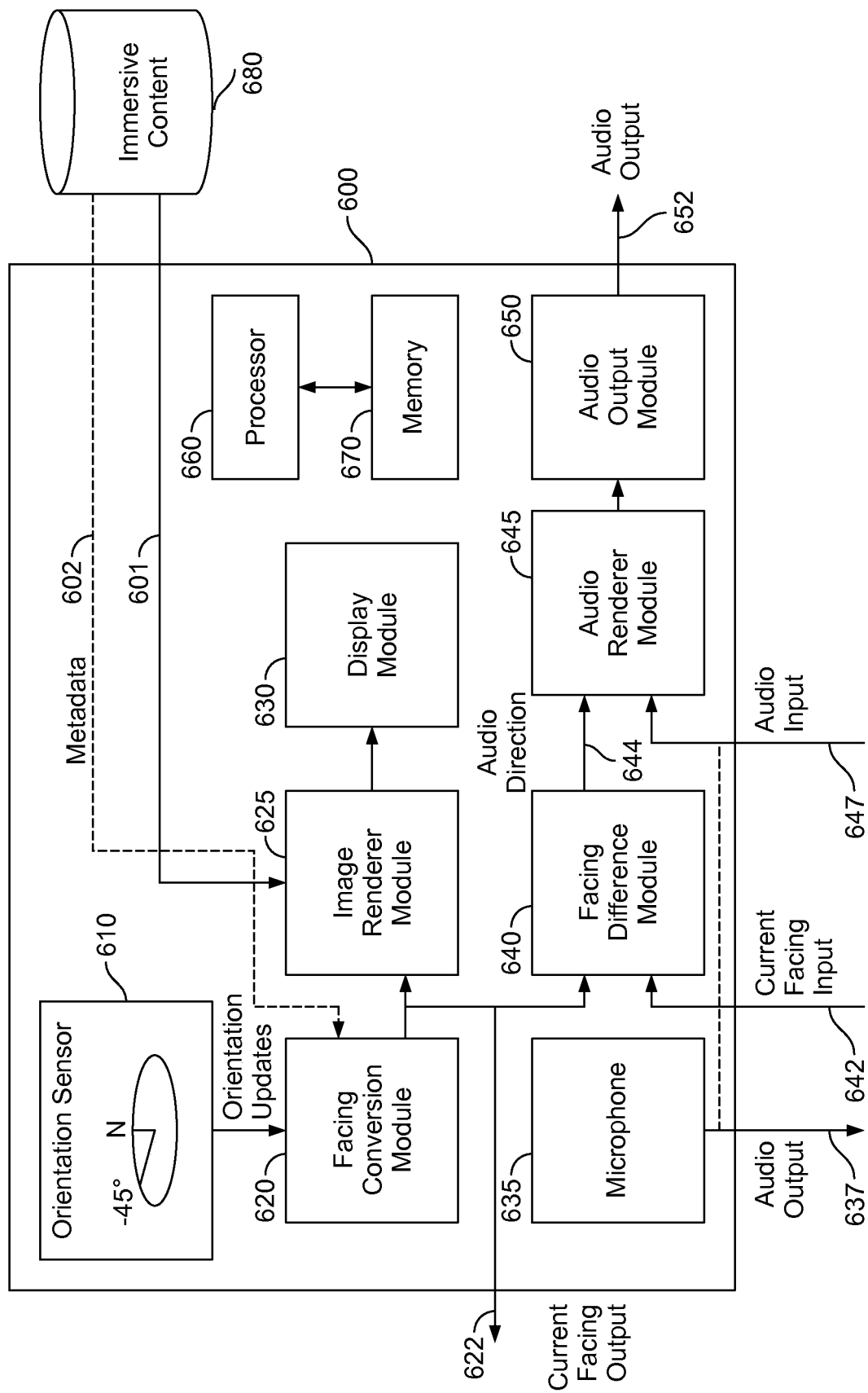
FIG. 6 illustrates a simplified block diagram of an exemplary immersive reality device in accordance with an embodiment of the present disclosure.

FIG. 6 illustrates a simplified block diagram of an exemplary immersive reality device 600 in accordance with an embodiment of the present disclosure. IR device or user station 600 may be similar to devices 160-1, 160-2, ..., 160-n, 181, 184, 220, 412, 462, 512 or 562. Device 600 may be used for sharing an IR experience in accordance with the present disclosure, and having access to an immersive media (e.g., 300). Device 600 may include orientation sensor 610, facing conversion module 620, image renderer module 625, display module 630, microphone 635, facing difference module 640, audio renderer module 645, audio output module 650, processor 660 and memory 670.

User station 600 may communicate with at least one second user station (e.g., 160-1 with 160-2 ... 160-n, 412 with 462, 512 with 562) including at least sending data representative of the audio and of the current facing output 622 over current communication channel (e.g., 155, 191, 193). The communication may be by way of Internet (e.g., 150), if needed, for example if the two stations (e.g., 160-1 and 160-2) are widely separated (e.g., in different households).

User station 600 works as follows. Orientation sensor 610 may provide orientation updates to facing conversion module 620. As previously discussed, orientation sensor 610 may rely on absolute orientation (e.g., magnetic north, facing relative to a camera or the environment, etc.), or relative orientation (e.g., for sensors that detect changes in orientation). Facing conversion module 620 may operate based on metadata 602 associated with the immersive media 680 (e.g., similar to IR content 300). Facing conversion module 620 may produce a current facing 622, which is supplied to image renderer module 625. The current facing 622 may also be sent (current facing output) over a communication channel to a second user station (e.g., 160-1 to 160-n, 181 and 184 in system 100) or another device (e.g., 105, 156) for processing. Image renderer 625 may take at least a portion or section 601 of immersive content 680 and, in conjunction with a current facing 622 from facing conversion module 620, may provide a first view to display module 630, which presents the first view to the user of device 600 (e.g., 210, 411, 461, 511, 561) so as to create VR experience (e.g., 200, 410, 460, 510, 560). Audio detected by microphone 635 may also be sent (audio output 637) over the communication channel to a second user station or another device (e.g., 105, 156) for processing. It is to be understood that, in other embodiments, the orientation sensor 610 and/or display module 630 may be externally coupled to device 600 by wired or wireless means, as previously described in association with device 160-1 of system 100.

In one embodiment, the at least one section 601 of immersive media 680 may be determined on the basis of the current facing 622, for example, where portion 601 represents a 120° width of media 680 (e.g., from +30° to +150°, representing the 120° centered on a current facing of azimuth=+90°). This example provides that the bandwidth requirement for delivering portion 601 to image renderer 625 is roughly ⅓ the requirement for delivering the whole media 680, with the expectation that user will not know the difference since the unsent portion of the media 680 would not have been rendered into the view and seen anyway.

User station 600 may require access to immersive media 680. In one embodiment, this access may be provided as a stream, as would be the case for a sporting event or other live show being broadcast or otherwise distributed in an IR format or other format. In one embodiment, user station 600 and at least one second user station (e.g., 160-1 to 160-n) may select distinct copies of the same content 680 to be played in synchronization with each other. Though not shown in FIG. 6, synchronized playback of independent access to a common content such as media 680, is well known in the art (see, for example, the synchronization network of Scott in U.S. Pat. No. 7,669,219). In one embodiment, separate copies of immersive content 680 may be local to each of a plurality of user stations (e.g., 160-1 to 160-n), for example if immersive content 680 is provided as a Blu-ray disk or loaded onto a local hard drive, which would be well suited to high quality, high bandwidth content. In another embodiment, the copies may be remotely located, as when media 680 is to be streamed from a server (e.g., 105) over the Internet (e.g., 150).

Data representing current facing 642 from a second user station (or second user) is received by facing difference module 640 and subtracted from the current facing 622 received from facing conversion module 620, resulting in an audio direction information 644 that is provided to the audio renderer module 645. Audio renderer module 645 uses the audio direction information 644 to render the audio data 647 received from the second user station to appear as if coming from the audio direction identified by the facing difference module. The resulting rendered audio 652 is presented to the second user through audio output module 650, which may drive an earphone, earbuds or speakers.

One example audio renderer module suitable for use with earphones is a binaural renderer. At its simplest, a binaural renderer will take a monophonic sound and present it in stereo to be delivered over two earphones, where a slight delay, less than 1 ms, is provided to one or the other of the channels, to simulate sounds coming from different directions. A sound coming from straight ahead (i.e., the apparent direction the sound is from has an azimuth of 0°) will arrive at both ears simultaneously, so the delay is 0 ms. A sound coming from due right (i.e., from an azimuth of +90°) will arrive at the right ear first, and because the left ear is farther away from the apparent sound source, it will arrive at the left ear later, by an amount of time or delay equal to roughly the additional distance around the head (about 10 inches, though a precise answer depends on individual morphology) divided by the speed of sound (about 340 meters/second at sea level, or about 13400 inches/second). The amount of time or delay is about $10/13400=0.75$ milliseconds (ms). Other delays between 0.0 ms and 0.75 ms appear to place the sound at various angles around the listener, with roughly a sine function relationship, i.e., 0.75 ms*sin(0°)=0.0 ms, whereas 0.75 ms*sin(90°)=0.75 ms. For a sound coming from the left, 0.75 ms*sin(−90°)=−0.75 ms, which is a negative delay representing a need to delay right ear by 0.75 ms, that is, positive delays are applied to audio for the left ear, and negative delays are applied (after taking the absolute value) to the audio for the right ear. The computed delay is always supplied to rendering of the audio for the farther away ear.

In one embodiment, the audio processing may be split among different devices. For example, a second user station may receive the current facing output 622 and audio output 637 from the first user station and performs the functionalities associated with Facing Difference module 640, Audio Renderer module 644 and Audio Output module 650. As an exemplary implementation, the first user, speaking into a microphone, has his voice recorded and encoded into an ambisonic encoding, where the directionality of his voice is set to the first viewing direction relative to the virtual point (e.g., the az=0° direction in FIGS. 3, 4 and 5). Upon receiving this ambisonic encoded presentation, the second user device performs the rendering of the ambisonic encoding into a binaural presentation, but with a rotation of the ambisonic field by an amount corresponding to the second viewing direction relative to the virtual point.

Note that there is nothing in the simplified rendering described above to differentiate sounds that are in front of the listener as opposed to behind, i.e., an audio direction of 0° and 180° both generate a 0.0 ms delay; a direction of +45° (ahead, to the right) and +135° (behind, to the right) both generate a 0.53 ms delay for the left ear. More sophisticated binaural rendering is known, based on more detailed head-related transfer functions (HRTF) that account for spectral differences in the sounds heard at each ear, the differences caused by the ear pinnae (also "auricle"), hair, difference in the lengths of various paths around the head to the far ear (e.g., around the front vs. over the top), and other even more subtle sources. An individual's HRTF may be directly measured and supplied to a more sophisticated renderer, but it is also the case that one individual's HRTF may work adequately for someone else. In some cases, the HRTFs of multiple subjects may be combined, to synthesize a generic HRTF that works adequately for the general population (though generally not as well as a customized one). Moreover, for the human brain, height may be generally differentiated by frequency, where a sound having a lower frequency may be perceived as coming from below the listener and a sound of higher frequency may be perceived as coming from above the listener. Furthermore, distance may be differentiated by volume or amplitude, where a loud sound may be perceived as close and a weak sound may be perceived as far. Hence, processing of the audio may also take advantage of these known rules.

In one embodiment, the audio output 652 might be an array of speakers (not shown) situated around the user head. For example, if on the headband of HMD (e.g., 220, 184), there may be four speakers, two speakers mounted on each side of user's head (e.g., 210), one a bit in front of the right ear, one a bit behind the right ear, and two similarly disposed on the left side, then audio renderer module 645 may direct sound to any of those speakers. Sound directly in front, i.e., with an audio direction having an azimuth of 0°, may be played simultaneously to both speakers in front of their respective ears. Sound from the front-left might be played only on the front-left speaker, although performance might be enhanced by playing sounds to the front-right side, too, but with the simple delay described above. Sounds to the rear may be played using the rear speakers to either side accordingly. In still another embodiment, the array of speakers might be located in the environment around the user, rather than be carried by user. For example, the speakers of a 7.1 sound system (not shown, but such as the one used for a household entertainment system), might be used to present sounds around a user seated among them.

In other embodiments, rather than wearing an HMDs (e.g., 220), a user might be using a non-worn HMD, as might be implemented with a desktop personal computer (PC), laptop, tablet, or smartphone. Such devices are capable of providing all the modules of device 600, though PCs and laptops typically lack an orientation sensor. For those instances where the HMD lacks an orientation sensor, or where the orientation sensor provided is not to be used (e.g., as a matter of user preference), the current facing may be based on a pointing input device, e.g., a mouse, flying mouse, track pad, touch screen, game controller, or the like, which allows the user to command a change in facing. Such a command, is received an acted on by the facing conversion module, which otherwise operates as herein described. A camera may also be used to identify a facing direction of a user. Either or both of users may employ a non-worn HMD to participate in the shared VR experience.

It is to be understood that at least some modules of user station 600 may be implemented in software stored in memory 670 and executed by processor 660, e.g., facing conversion module 620, image renderer module 625, facing difference module 640, audio renderer module 644. Although not shown in FIG. 6, processor 660 may control operation of all the other modules of device 600.

Figure 7:
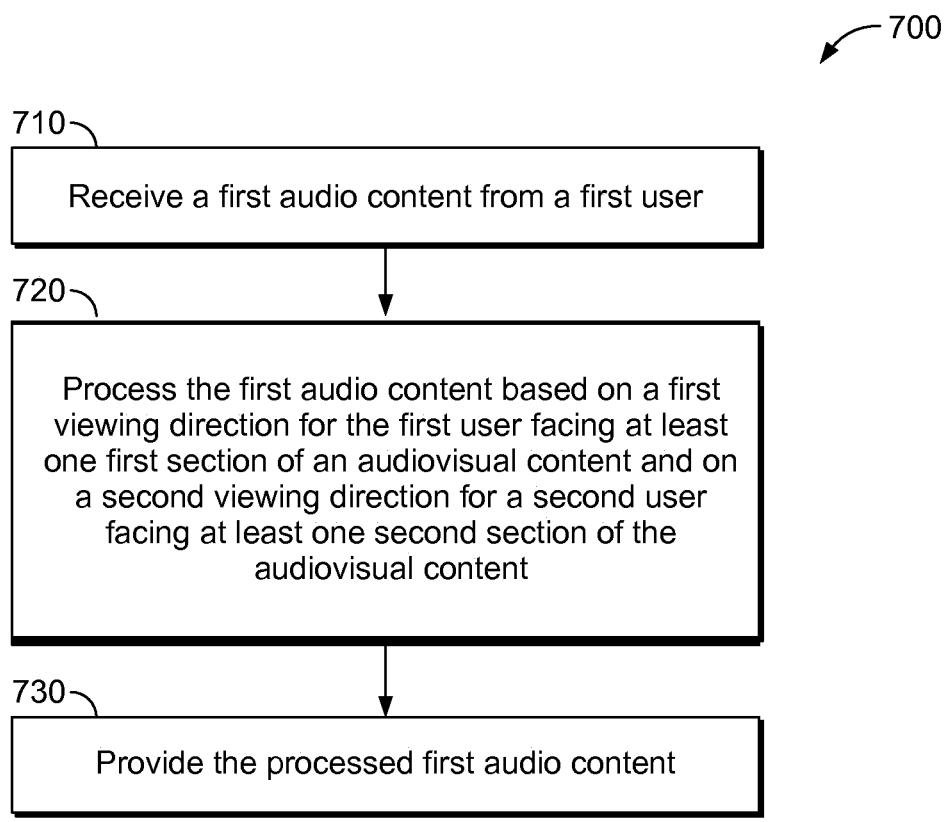
FIG. 7 illustrates a flowchart of an exemplary method of providing audio content in accordance with an embodiment of the present disclosure.

FIG. 7 illustrates a flowchart 700 of an exemplary method of providing audio content in accordance with the present disclosure. The method may include, at step 710, receiving a first audio content from a first user. Then, at step 720, the method may include processing the first audio content based on a first viewing direction for the first user facing at least one first section of an audiovisual content and on a second viewing direction for a second user facing at least one second section of the audiovisual content. Finally, at step 730, the method may include providing the processed first audio content. The at least one first section of the audiovisual content is being displayed to the first user. And the at least one second section of the audiovisual content is being displayed to the second user. The steps of the method may be performed by a processor, e.g., 172, 660, 110. Alternately, the step of processing may be performed by, e.g., facing difference module 640 and audio renderer module 644. The step of providing may be performed by, e.g., audio output module 650. The providing step may provide for audio playback, store in memory (e.g., 176, 670, 125), provide to the second user and/or provide to the first user.

In one embodiment of the method, the first audio content is processed based on an angular difference between the first viewing direction and the second viewing direction. The angular difference may be determined by, e.g., facing difference module 640. The audio processing may be performed by, e.g., audio renderer module 645.

In one embodiment of the method, the processed first audio content is perceived by the second user as originating from a virtual point in the at least one first section of the audiovisual content, the virtual point being an intersection between the first viewing direction and the at least one first section of the audiovisual content.

In one embodiment of the method, a left audio component and a right audio component of the processed first audio content are adjusted according to the angular difference. The audio processing may be performed, e.g., in audio renderer module 645.

In one embodiment of the method, the left audio component is delayed in time with respect to the right audio component when the angular difference between the first viewing direction and the second viewing direction is between zero degree(0°) and one hundred and eight degrees (180°). In other words, the virtual point or the first viewing direction is to the right of the second viewing direction.

In one embodiment of the method, the right audio component is delayed with respect to the left audio component amplitude when the angular difference between the first viewing direction and the second viewing direction is between minus one hundred and eighty degrees (−180°) and zero degree (0°) or, equivalently, between one hundred and eighty degrees (180°) and three hundred and sixty degrees (360°). In other words, the virtual point or the first viewing direction is to the left of the second viewing direction.

In one embodiment of the method, the processed first audio content is provided to the second user for audio playback. The providing may be performed, e.g., in audio output module 650.

In one embodiment of the method, a viewing direction is a function of at least one of a head movement and eye movement of the user.

In one embodiment of the method, the audiovisual content is an immersive reality content.

In one embodiment of the method, the audiovisual content is a 360-degree content.

In one embodiment of the method, the audiovisual content is a 3 DoF immersive reality content.

In one embodiment, the method may be performed by one of a first user's device, a second user's device and a third device (e.g., a server).

The method 700 may be performed by, e.g., device 160-1, 160-2, . . . 160-n, 181, 184, 220, 600, 156 or 105, including any of the embodiments previously described. In particular, the steps of the method may be performed by, e.g., processor 172, 660 or 110.

It is important to note that one or more of the elements in the process 700 may be combined, performed in a different order, or excluded in some embodiments while still implementing the aspects of the present disclosure.

According to one embodiment of the present disclosure, an apparatus 160-1,181, 184, 220, 600, 156, 105 for providing audio content is provided including a processor 172, 660, 110 and at least one memory 176, 670, 125 coupled to the processor, the processor being configured to perform any of the embodiments of the method 700.

It is to be understood that the term processor may represent at least one processor performing the functions described above in a joint architecture, serial, parallel or mixed.

Figure 8:
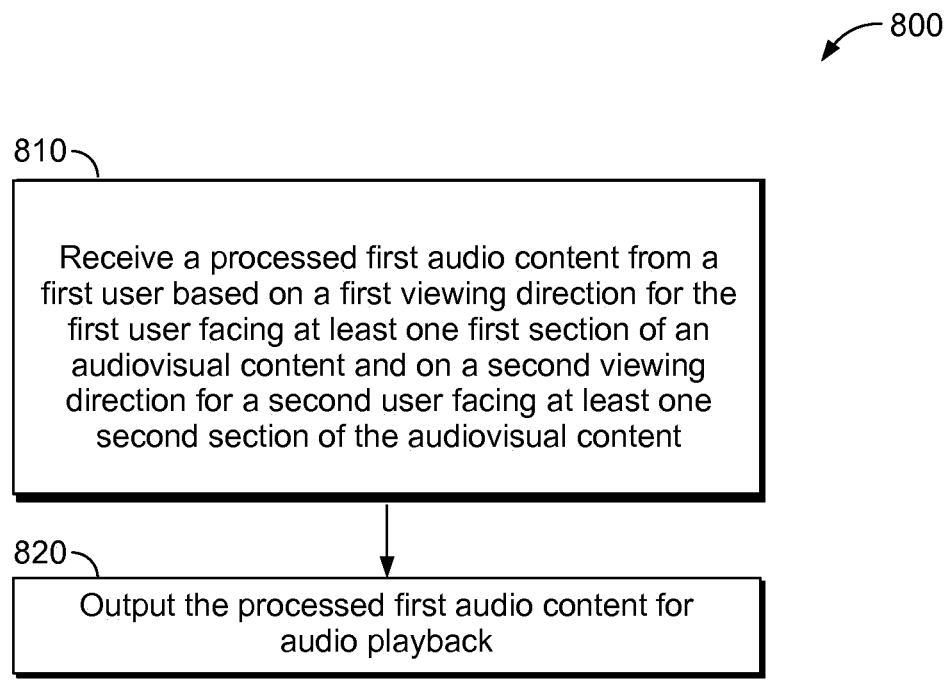
FIG. 8 illustrates a flowchart of an exemplary method of receiving audio content in accordance with an embodiment of the present disclosure.

FIG. 8 illustrates a flowchart 800 of an exemplary method of receiving audio content in accordance with the present disclosure. The method may include, at step 810, receiving a processed first audio content from a first user based on a first viewing direction for the first user facing at least one first section of an audiovisual content and on a second viewing direction for a second user facing at least one second section of the audiovisual. Then, at step 820, the method may include outputting the processed first audio content for audio playback. The at least one first section of the audiovisual content is being displayed to the first user. And the at least one second section of the audiovisual content is being displayed to the second user. The steps of the method may be performed by a processor, e.g., 172, 660, 110. Alternately, the step of providing may be performed by, e.g., audio output module 650.

In one embodiment of the method, the first audio content is processed based on an angular difference between the first viewing direction and the second viewing direction. The angular difference may be determined by, e.g., facing difference module 640. The audio processing may be performed by, e.g., audio renderer module 645.

In one embodiment of the method, the processed first audio content is perceived by the second user as originating from a virtual point in the at least one first section of the audiovisual content, the virtual point being an intersection between the first viewing direction and the at least one first section of the audiovisual content.

In one embodiment of the method, a left audio component and a right audio component of the processed first audio content are adjusted according to the angular difference. The audio processing may be performed, e.g., in audio renderer module 645.

In one embodiment of the method, the left audio component is delayed in time with respect to the right audio component when the angular difference between the first viewing direction and the second viewing direction is between zero degree (0°) and one hundred and eight degrees (180°). In other words, the virtual point or the first viewing direction is to the right of the second viewing direction.

In one embodiment of the method, the right audio component is delayed with respect to the left audio component amplitude when the angular difference between the first viewing direction and the second viewing direction is between minus one hundred and eighty degrees (−180°) and zero degree (0°) or, equivalently, between one hundred and eighty degrees (180°) and three hundred and sixty degrees (360°). In other words, the virtual point or the first viewing direction is to the left of the second viewing direction.

In one embodiment of the method, the processed first audio content is provided to the second user for audio playback. The providing may be performed, e.g., in audio output module 650.

In one embodiment of the method, a viewing direction is a function of at least one of a head movement and eye movement of the user.

In one embodiment of the method, the audiovisual content is an immersive reality content.

In one embodiment of the method, the audiovisual content is a 360-degree content.

In one embodiment of the method, the audiovisual content is a 3 DoF immersive reality content.

In one embodiment, the method may be performed by one of a first user's device, a second user's device and a third device (e.g., a server).

The method 800 may be performed by, e.g., device 160-1, 160-2, . . . 160-n, 181, 184, 220, 600, 156 or 105, including any of the embodiments previously described. In particular, the steps of the method may be performed by, e.g., processor 172, 660 or 110.

It is important to note that one or more of the elements in the process 800 may be combined, performed in a different order, or excluded in some embodiments while still implementing the aspects of the present disclosure.

According to one embodiment of the present disclosure, an apparatus 160-1,181, 184, 220, 600, 156, 105 for receiving audio content is provided including a processor 172, 660, 110 and at least one memory 176, 670, 125 coupled to the processor, the processor being configured to perform any of the embodiments of the method 800.

It is to be understood that the term processor may represent at least one processor performing the functions described above in a joint architecture, serial, parallel or mixed.

Moreover, methods 700 and 800 may be implemented as computer program products including computer executable instructions which may be executed by a processor. The computer program product having the computer-executable instructions may be stored in the respective non-transitory computer-readable storage media of the respective above-mentioned devices, e.g., 176, 670, 125.

According to one aspect of the present disclosure, a non-transitory computer program product is provided including program code instructions for performing any of the embodiments of the method 700 of providing audio content.

According to one aspect of the present disclosure, a non-transitory article of manufacture is provided tangibly embodying computer readable program code instructions which when executed cause a computer to perform any of the embodiments the method 700 of providing audio content.

According to one aspect of the present disclosure, a computer program product is provided including code instructions executable by a processor for implementing any of the embodiments the method 700 of providing audio content.

According to one aspect of the present disclosure, a non-transitory computer program product is provided including program code instructions for performing any of the embodiments of the method 800 of receiving audio content.

According to one aspect of the present disclosure, a non-transitory article of manufacture is provided tangibly embodying computer readable program code instructions which when executed cause a computer to perform any of the embodiments the method 800 of receiving audio content.

According to one aspect of the present disclosure, a computer program product is provided including code instructions executable by a processor for implementing any of the embodiments the method 800 of receiving audio content.

Furthermore, aspects of the present disclosure can take the form of a computer-readable storage medium. Any combination of one or more computer-readable storage medium(s) may be utilized. A computer-readable storage medium can take the form of a computer-readable program product embodied in one or more computer-readable medium(s) and having computer-readable program code embodied thereon that is executable by a computer. A computer-readable storage medium as used herein is considered a non-transitory storage medium given the inherent capability to store the information therein as well as the inherent capability to provide retrieval of the information therefrom. A computer-readable storage medium can be, for example, but is not limited to, an electronic, magnetic, optical, electromagnetic, infrared, or semiconductor system, apparatus, or device, or any suitable combination of the foregoing.

It is to be appreciated that the following, while providing more specific examples of computer-readable storage mediums to which the present disclosure can be applied, is merely an illustrative and not exhaustive listing as is readily appreciated by one of ordinary skill in the art: a portable computer diskette, an HDD, a ROM, an erasable programmable read-only memory (EPROM or Flash memory), a portable compact disc read-only memory (CD-ROM), an optical storage device, a magnetic storage device, or any suitable combination of the foregoing.

According to an aspect of the present disclosure, a computer-readable storage medium is provided carrying a software program including program code instructions for performing any of the embodiments of the method 700 of providing audio content.

According to an aspect of the present disclosure, a computer-readable storage medium is provided carrying a software program including program code instructions for performing any of the embodiments of the method 800 of receiving audio content.

It is to be understood that reference to "one embodiment" or "an embodiment" or "one implementation" or "an implementation" of the present disclosure, as well as other variations thereof, mean that a particular feature, structure, characteristic, and so forth described in connection with the embodiment is included in at least one embodiment of the present disclosure. Thus, the appearances of the phrase "in one embodiment" or "in an embodiment" or "in one implementation" or "in an implementation", as well any other variations, appearing in various places throughout the specification are not necessarily all referring to the same embodiment or to a single embodiment.

Additionally, the present disclosure or its claims may refer to "determining" various pieces of information. Determining the information may include one or more of, for example, estimating the information, calculating the information, predicting the information, or retrieving the information from memory.

Also, the present disclosure or its claims may refer to "providing" various pieces of information. Providing the information may include one or more of, for example, outputting the information, storing the information, transmitting the information, sending the information, displaying the information, showing the information, or moving the information.

Moreover, the present disclosure or its claims may refer to "accessing" various pieces of information. Accessing the information may include one or more of, for example, receiving the information, retrieving the information (for example, from memory), storing the information, processing the information, moving the information, copying the information, erasing the information, calculating the information, determining the information, predicting the information, or estimating the information.

Further, the present disclosure or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the various features shown and described in the present disclosure are interchangeable. Unless otherwise indicated, a feature shown in one embodiment may be incorporated into another embodiment. Further, the features described in the various embodiments may be combined or separated unless otherwise indicated as inseparable or not combinable.

As noted before, the functions of the various elements shown in the figures may be provided through the use of dedicated hardware as well as hardware capable of executing software in association with appropriate software. Also, when provided by a processor, the functions may be provided by a single dedicated processor, by a single shared processor, or by a plurality of individual processors, some of which may be shared.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope of the present disclosure. In addition, individual embodiments can be combined, without departing from the scope of the present disclosure. All such changes and modifications are intended to be included within the scope of the present disclosure as set forth in the appended claims.

The invention claimed is:

1. A method comprising:
receiving audio content from a first user, the audio content generated by the first user while viewing immersive audiovisual content according to a first viewing direction;
determining a virtual point within the immersive audiovisual content for rendering the audio content to a second user, the virtual point based on an intersection between the first viewing direction and a portion of the immersive audiovisual content in a view of the first user; and
while the second user is viewing the immersive audiovisual content from a second viewing direction, rendering the audio content to the second user from the virtual point.

2. The method of claim 1, wherein determining the virtual point further comprises determining the virtual point based on a difference between the first viewing direction and the second viewing direction.

3. The method of claim 1, wherein the immersive audiovisual content comprises 360 degree video content.

4. The method of claim 1, further comprising displaying the immersive audiovisual content using three degrees of freedom (3DoF) to at least one of the first user and the second user.

5. The method of claim 1, wherein the immersive audiovisual content is at least part of an immersive interactive experience.

6. The method of claim 1, wherein the immersive audiovisual content comprises three-dimensional (3D) computer generated content.

7. The method of claim 1, wherein the audio content comprises words spoken by the first user while viewing the immersive audiovisual content.

8. The method of claim 1, wherein the audio content is captured using a microphone of a virtual reality viewing device of the first user.

9. The method of claim 1, wherein the second viewing direction differs from the first viewing direction such that the virtual point is not within a view of the second user at a time of rendering of the audio content.

10. The method of claim 1, wherein rendering the audio content to the second user from the virtual point further comprises rendering the audio content such that the rendered audio content is perceived by the second user to originate from the virtual point.

11. An apparatus comprising:
a processor; and
a non-transitory computer-readable medium storing instructions operative, when executed by the processor, to cause the apparatus to:
receive audio content from a first user, the audio content generated by the first user while viewing immersive audiovisual content according to a first viewing direction;
determine a virtual point within the immersive audiovisual content for rendering the audio content to a second user, the virtual point based on an intersection between the first viewing direction and a portion of the immersive audiovisual content in a view of the first user; and
while the second user is viewing the immersive audiovisual content from a second viewing direction, render the audio content to the second user from the virtual point.

12. The apparatus of claim 11, wherein determining the virtual point further comprises determining the virtual point based on a difference between the first viewing direction and the second viewing direction.

13. The apparatus of claim 11, wherein the immersive audiovisual content comprises 360 degree video content.

14. The apparatus of claim 11, wherein the instructions, when executed by the processor, are further operative to cause the apparatus to display the immersive audiovisual content using three degrees of freedom (3DoF) to at least one of the first user and the second user.

15. The apparatus of claim 11, wherein the immersive audiovisual content is at least part of an immersive interactive experience.

16. The apparatus of claim 11, wherein the immersive audiovisual content comprises three-dimensional (3D) computer generated content.

17. The apparatus of claim 11, wherein the audio content comprises words spoken by the first user while viewing the immersive audiovisual content.

18. The apparatus of claim 11, wherein the audio content is captured using a microphone of a virtual reality viewing device of the first user.

19. The apparatus of claim 11, wherein the second viewing direction differs from the first viewing direction such that the virtual point is not within a view of the second user at a time of rendering of the audio content.

20. The apparatus of claim 11, wherein rendering the audio content to the second user from the virtual point further comprises rendering the audio content such that the rendered audio content is perceived by the second user to originate from the virtual point.

* * * * *